Dec. 11, 1934.　　　G. F. KÄPERNICK　　　1,984,136
SPECTACLES
Filed Feb. 9, 1933　　2 Sheets-Sheet 1
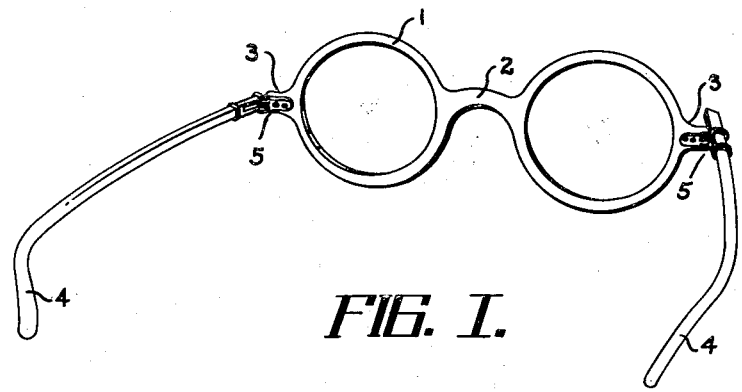
FIG. I.
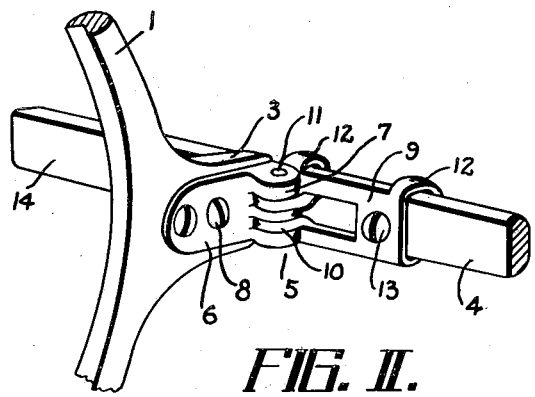
FIG. II.
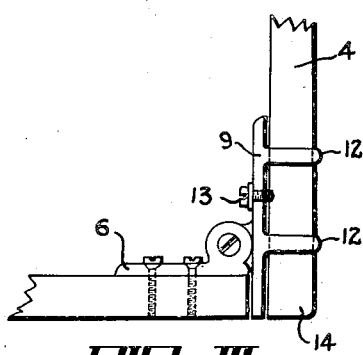
FIG. III.
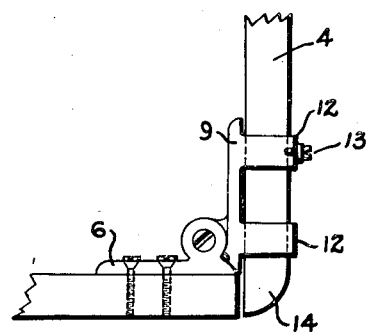
FIG. IV.
INVENTOR
GEORG FRIEDRICH KÄPERNICK
BY
Harry H. Styll
ATTORNEY Dec. 11, 1934.  G. F. KÄPERNICK  1,984,136
SPECTACLES
Filed Feb. 9, 1933   2 Sheets-Sheet 2
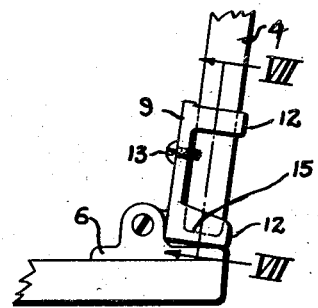
FIG. VI.
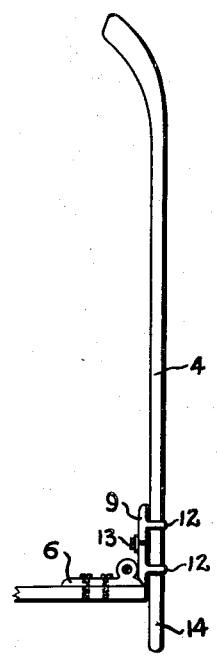
FIG. V.
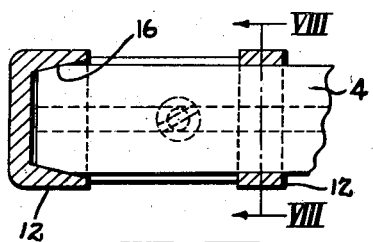
FIG. VII.
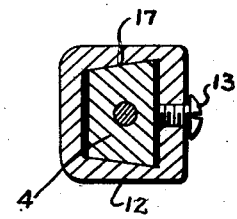
FIG. VIII.
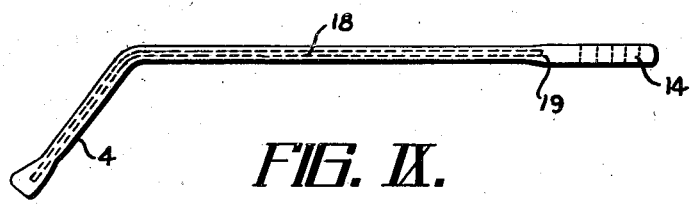
FIG. IX.
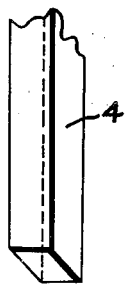
FIG. X.
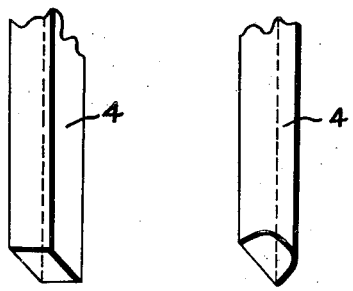
FIG. XI.  FIG. XII.
INVENTOR
GEORG FRIEDRICH KÄPERNICK.
BY Harry H. Styll
ATTORNEY Patented Dec. 11, 1934

1,984,136

UNITED STATES PATENT OFFICE 1,984,136

SPECTACLES

Georg Friedrich Käpernick, Frankfort-on-the-Main, Germany, assignor to American Optical Company, Southbridge, Mass., a voluntary association of Massachusetts Application February 9, 1933, Serial No. 655,949
In Germany November 17, 1931

4 Claims. (Cl. 88—53)

This invention relates to spectacles and more particularly to a temple connection for the same and to the process of fitting the temple to the spectacle.

One of the principal objects of the invention is to provide connections that will permit the use of a temple of a given length in cases of different distances from the ear to the temple connection to accommodate the facial variations of different individuals.

Other objects of the invention are to provide means for adjusting the temple to required length, to provide a combined temple hinge and adjustable temple lock, to provide means for attaching temples of different cross sectional shape, to provide means for adjusting the length of a wire cored temple and to provide simple, efficient and inexpensive means of good appearance to utilize a temple of given length for all cases thereby eliminating the necessity of making stocks of temples of different lengths as in the prior art and thus reducing the cost of production and the carrying of large and expensive stocks.

Other objects and advantages of the invention will become apparent from the following description taken in connection with the accompanying drawings. It will be apparent that many changes may be made in the details of construction, arrangement of parts and the steps of the process without departing from the spirit of the invention as expressed in the accompanying claims. I therefore do not wish to be limited to the exact means and methods shown and described as the preferred forms only have been shown by way of illustration.

Referring to the drawings:

Fig. I is a perspective view of a spectacle in which the invention is embodied.

Fig. II is an enlarged partial perspective view showing the temple and hinge connection.

Fig. III is a partial plan view showing the hinge connection of the temple.

Fig. IV is a view similar to Fig. III showing a modification of the hinge connection and end of the temple at the hinge connection.

Fig. V is a partial plan view showing the hinge connection and the full length of the temple.

Fig. VI is a view similar to Fig. III showing a modified hinge connection.

Fig. VII is a section on line VII—VII of Fig. VI.

Fig. VIII is a section on line VIII—VIII of Fig. VII.

Fig. IX is a plan view of a wire cored temple, and

Figs. X, XI and XII are partial plan views of temples having different cross sectional shapes.

As is well known the distance from the ear to the temple connection of a spectacle is different and varies for persons having different facial characteristics, and this variation is quite considerable. In the past the manufacturer of temples has had to make up temples in various lengths, the lengths being graded by standardized amounts. This necessitated that the dealer in order to provide temples of the correct length for his patients had to carry large and expensive stocks, many of the numbers never being called for and thus tying up a considerable investment, some of which was subject to eventual total loss in the event of the change of styles, etc.; also the patient was never quite sure of getting his exact length, all he could get was the nearest standard to it. The prior art temples then were neither economical nor accurate. It is a principal object of my invention to avoid these disadvantages and to provide a single temple that will fit all cases accurately. In the case of spectacles made of celluloid or shell or imitation shell, the temples are large and expensive and my invention is particularly applicable to these types of spectacles.

Referring to the drawings in which similar reference characters denote corresponding parts throughout:

In Fig. I the rims 1 are connected by the bridge 2 in the usual way. The rims have the endpieces 3 on the temporal sides. The temples 4 are connected to the endpieces 3 by the hinge connections 5. In Fig. II, the temple 4 is connected to the endpiece 3 by the hinge 5. This hinge 5 has the hinge member 6, provided with the hinge ears 7 and secured to the endpiece 3 by the screw or rivet connections 8 and also the hinge member 9 having the hinge ears 10, hingedly connected to the hinge ears 7 by the hinge pin 11. The member 9 has the slide members 12 through which the temple 4 slides. The member 9 is adjustably secured to the temple by the lock screw 13. The end 14 of the temple 4 projects beyond the end of the endpiece 3.

To attach the temple 4 it is slid into the member 9 through the slides 12, adjusted to required length and locked in place by the lock screw 13. The end 14 of the temple can then be cut off flush with the endpiece 3 if so desired, and a neat appearing fit be obtained.

Fig. III shows the end 14 cut off square and flush with the endpiece, and the lock screw 13 located between the slides 12 instead of the position shown in Fig. II.

Fig. IV shows the end 14 of the temple rounded instead of square as in Fig. III and shows the lock screw 13 on the outside of the rear slide member 12.

Fig. V shows the full temple in place without the end 14 being cut off.

Fig. VI shows the hinge member 9 having the outer slide member 12 provided with a bottom wall or end 15, and this wall engaging the hinge member 6 to act as a stop. This construction provides a neater end appearance for the temple at its connection to the endpiece. In this construction the temple is cut off to length before it is fitted in the slide. The wall 15 may be made as a tapered box as shown in Fig. VII at 16 and the outer end of the temple tapered to fit therein. This provides an additional lock connection for the end of the temple and makes a stronger and more secure connection. The walls of the rearward slide 12 may also be tapered at 17 as shown in Fig. VIII providing a tight wedge shaped fit to prevent twisting and turning of the temple in its connection.

Where a wire core 18 is used in the temple, see Fig. IX, the outer end of the wire core at 19 is maintained at a distance from the outer end of the temple sufficient to allow for the end 14 being cut off to length without cutting through the wire. This is important where base metal cores are used because the cut off exposed end of the core would tarnish, and look bad.

Various shapes of temple in cross section may be used as for example, rectangular as shown in Fig. X, semicircular as shown in Fig. XI and triangular as shown in Fig. XII.

The process of fitting has been described above, with the open end slide the temple is fitted to length in the slide, locked, and cut off flush, with the closed end slide the temple is cut to length, placed in the slide and locked in place.

With the open end slides the temples are slid into the guides, the spectacle placed on the face of the wearer, the temples moved to required length over the ears; the temples are then locked in place in the guides and cut off if desired. With the closed end guide the distances from the temple connections to the patient's ears are measured, the length of temples determined, the temples are then cut to length, inserted in the guides and locked in place so that the temples are of required length. It is clear that with this invention the temples can be adjusted on the patient's face to exact length and locked in place in the guides.

It is clear that temples of any desired material may be used and of any desired cross sectional shape.

From the foregoing it will be seen that I have provided simple and inexpensive means for carrying out the objects of the invention and for obtaining its advantages.

Having described my invention I claim:

1. An ophthalmic mounting having an adjustable temple comprising a lens holding member having a hinged temple support on its temple side, said temple support having a slideway longitudinally thereof in a direction substantially normal to the axis of the hinge, a temple having a portion to engage the head and having a bar-like side portion fitted and slidably mounted in the slideway so that a portion thereof can be projected forwardly of said slideway when the mounting is held in its position of use and with the portion adjacent its opposite end engaging the head of an individual, said bar-like side portion initially being of a length sufficient to meet the requirements of different individuals as to length of temple, whereby the said bar-like portion may be adjusted to the length required, the excess portion thereof removed and the remaining end shaped to fit the adjacent end of the temple support, and adjustable means for securing the bar-like side portion in adjusted position in the slideway, said bar-like portion being held in aligned relation with the slideway independently of said securing means.

2. An ophthalmic mounting having an adjustable temple comprising a lens holding member having a hinged temple support on the temple side, said temple support having spaced ring-like members in aligned relation with each other in a direction substantially normal to the axis of the hinge, a temple having a head engaging portion and having a bar-like side portion slidably mounted in the spaced ring-like members so that a portion thereof can be projected forwardly of said ring-like members when the mounting is held in its position of use and with the portion adjacent its opposite end engaging the head of an individual, said bar-like side portion being initially of a length sufficient to meet the requirements of different individuals as to the length of temple, whereby the said bar-like portion may be adjusted to the length required, the excess portion thereof removed and the remaining end shaped to fit the adjacent end of the temple support, and adjustable means for securing the bar-like portion in adjusted position in the ring-like members, said bar-like portion being held in aligned relation with the ring-like members independently of said securing means.

3. The method of fitting an ophthalmic mounting to the requirements of an individual comprising providing a lens holding member having a hinged temple support on its temple side, said temple support having spaced ring-like members aligned with each other in a direction substantially normal to the axis of the hinge and adjustable securing means associated with said members, forming a temple having a bar-like side portion of a length sufficient to meet the requirements of different individuals as to length of temple and shaping the opposite end to fit and engage the head of the individual, placing the bar-like side portion in the spaced ring-like members with a portion thereof projecting forwardly of the mounting when it is held in its position of use, placing the mounting on the face of the individual with the lens holding means in proper position thereon, sliding the bar-like side portion longitudinally through the spaced ring-like members to position the head engaging portion of the temple in proper relation with the head of the individual and to obtain the required length of temple to fit the individual, tightening the securing means to secure the bar like portion in fixed relation with the ring like members when in said adjusted position, removing the excess projecting portion of the bar like portion from its end adjacent the spaced ring like members, and finishing said end to the shape desired and to fit the temple support, said bar like portion being held in aligned relation with the ring like members independently of the securing means.

4. The method of fitting an ophthalmic mounting to the requirements of an individual comprising providing a lens holding member having a hinged temple support on its temple side, said temple support having a slideway longitudinally thereof in a direction substantially normal to the axis of the hinge and having adjustable securing means asoociated therewith, forming a temple having a bar like side portion shaped to fit the slideway and of a length sufficient to meet the requirements of different individuals as to length of temple and shaping the opposite end to fit and engage the head of the individual, placing the bar like side portion in the slideway with a portion thereof projecting forwardly thereof when the mounting is held in its position of use, placing the mounting on the face of the individual with the lens holding means in proper position thereon, sliding the bar like side portion longitudinally of the slideway to position the head engaging portion of the temple in proper relation with the head of the individual and to obtain the required length of temple, tightening the securing means to secure the bar like portion in fixed relation with the slideway when in said adjusted position, removing the excess portion of the bar like portion from its end adjacent the slideway and finishing said end to the shape desired and to fit the temple support, said bar like portion being held in aligned relation with the slideway independently of the securing means.

GEORG FRIEDRICH KÄPERNICK.